Dec. 30, 1930.   G. R. HIPPLE   1,786,845
TAPE MEASURE
Filed Nov. 13, 1930
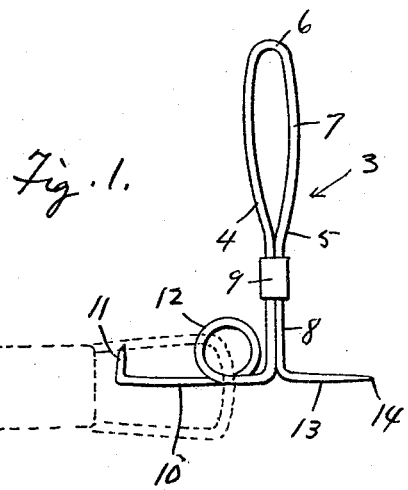
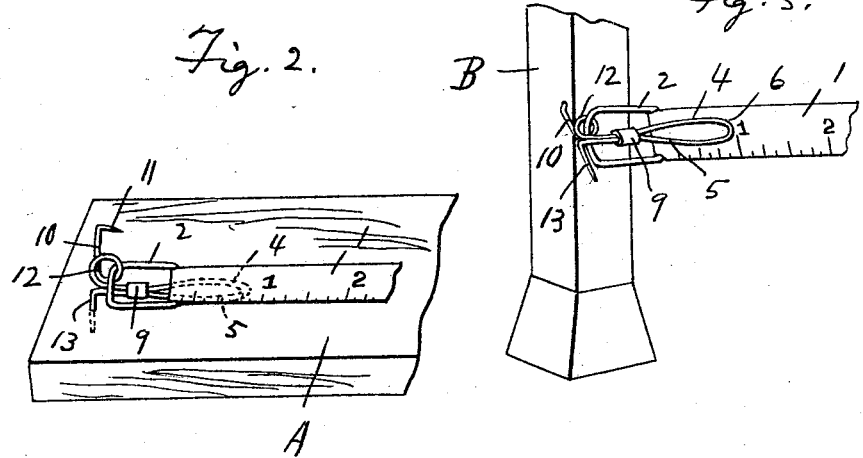
Inventor
George R. Hipple
By Clarence A O'Brien
Attorney Patented Dec. 30, 1930

1,786,845

UNITED STATES PATENT OFFICE

GEORGE R. HIPPLE, OF POTTSTOWN, PENNSYLVANIA

TAPE MEASURE

Application filed November 13, 1930. Serial No. 495,526.

The present invention relates to improvements in tape measures and has for its principal object to provide an attachment for the looped end of the tape measure whereby the same may be anchored to facilitate a person in making measurements alone, and furthermore to enable accurate measurements to be obtained.

One of the important objects of the present invention is to provide a tape measure wherein a hook member formed of a single strand of wire can be readily and easily attached or detached from the loop carried by the free end of the tape measure, said hook being simple in construction, inexpensive, strong and durable and further well adapted to the purpose for which it is designed.

Other objects and advantages of the invention will become apparent from the following description when taken in connection with the accompanying drawings.

In the accompanying drawing wherein like reference characters indicate corresponding parts throughout the same:

Figure 1 is a side elevation of the hook forming a salient part of the present invention.

Figure 2 is a detail view showing the hook secured to the looped end of a tape measure and being anchored on a board on the upper face thereof.

Figure 3 is a similar view showing the use of the hook in securing the looped end of the tape measure to an angular support.

In the drawing wherein for the purpose of illustration is shown the preferred embodiment of my invention, the numeral 1 designates an ordinary tape measure provided at its free end with the usual loop 2, the tape measure being provided with the usual graduations.

The hook which is designated generally by the numeral 3 is formed from a single strand of wire bent back upon itself intermediate its ends to provide a pair of arm portions 4 and 5 respectively, and a bight portion 6. The portions of the arms adjacent the bight portion are curved outwardly in opposite directions to form a handle 7 and the portions of the arms inwardly of the handle are disposed in abutting relation as illustrated at 8, a band or sleeve 9 being disposed thereover to maintain this portion of the arms in such relation.

The outer free end of the arm 4 is disposed laterally as at 10 and this arm 4 is of greater length than the arm 5, the extremity of the laterally disposed portion 10 being bent inwardly to form a tooth or prong 11.

The intermediate portion of the laterally disposed end portion 10 of the arm 4 is so bent as to form a loop or ring 12 for connection with the loop 2 carried by the free end of the tape measure 1 and the manner in which the loop 2 is secured in this ring 12 is thought to be readily obvious from the construction shown.

The free end of the shorter arm 5 is disposed laterally in the opposite direction as shown at 13, and the extremity of the laterally disposed portion 13 is sharpened to form a tooth 14.

As shown in Figure 2, the tooth 14 is driven downwardly into the top surface of the board A whereby to anchor the looped end of the tape measure so that a single person may make the necessary measurements, and this in an accurate manner.

In Figure 3 the hook is shown as being connected to an angular support B, and in this respect, the tooth 11 that is disposed at right angles with respect to the laterally disposed end portion 10 of the arm 4 engages in one side face of the support B, and the major portion of the hook together with the looped end of the tape measure will be disposed against the adjacent face of the angular support.

It will thus be seen from the foregoing description, that I have provided a tape measure attachment that will save considerable time and labor in obtaining accurate measurements, and furthermore only one person is necessary to do the measuring with a hook as attached to the loops of the tape measure.

While I have shown the preferred embodiment of my invention it is to be understood that minor changes in the size, shape and arrangement of parts may be resorted to without departing from the spirit and scope of the appended claims.

Having thus described the invention, what I claim is:

1. In a tape measure, the combination with a tape having a loop attached to the end thereof, of a hook formed of a single strand of wire bent intermediate its ends to form a pair of arms, the free ends of the arms being disposed laterally in opposite directions and terminating in object-engaging teeth, one of the laterally disposed ends being formed with a ring portion linked with the loop.

2. In a tape measure, the combination with a tape having a loop member attached to the end thereof, of a hook comprising a single strand of wire bent back upon itself to provide a pair of arms, the portions of the arms adjacent the bight portion forming a handle, the free ends of the arms being disposed laterally of the handle portion in opposite directions, one of the laterally extending portions being bent to form a ring which is linked with the looped member on the end of the tape, each end of the laterally disposed portion being sharpened to provide an object-engaging tooth, one of the toothed ends being disposed at right angles with respect to the adjacent laterally disposed portion.

3. In a tape measure, the combination with a tape having a loop member attached to the end thereof, of a hook comprising a single strand of wire bent back upon itself to provide a pair of arms, the portions of the arms adjacent the bight portion forming a handle, the free ends of the arms being disposed laterally of the handle portion in opposite directions, one of the laterally extending portions being bent to form a ring which is linked with the looped member on the end of the tape, each end of the laterally disposed portion being sharpened to provide an object-engaging tooth, one of the toothed ends being disposed at right angles with respect to the adjacent laterally disposed portion, the portions of the arms inwardly of the handle portion being disposed in abutting relation, and a sleeve surrounding the abutting portions of the arms.

In testimony whereof I affix my signature.

GEORGE R. HIPPLE.